United States Patent
Rahman et al.

(10) Patent No.: US 8,174,158 B2
(45) Date of Patent: May 8, 2012

(54) METHODS AND APPARATUS FOR A PERMANENT MAGNET MACHINE WITH ASYMMETRICAL ROTOR MAGNETS

(75) Inventors: Khwaja M. Rahman, Troy, MI (US);
Edward L. Kaiser, Orion, MI (US);
Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 296 days.

(21) Appl. No.: 12/390,045

(22) Filed: Feb. 20, 2009

(65) Prior Publication Data

US 2010/0213781 A1    Aug. 26, 2010

(51) Int. Cl.
*H02K 1/27* (2006.01)
(52) U.S. Cl. .......... 310/156.53; 310/156.56; 310/156.57
(58) Field of Classification Search . 310/156.01–156.84
See application file for complete search history.

(56) References Cited

U.S. PATENT DOCUMENTS

| | | | | |
|---|---|---|---|---|
| 6,177,745 | B1* | 1/2001 | Narita et al. | 310/156.43 |
| 6,885,125 | B2* | 4/2005 | Inayama et al. | 310/216.043 |
| 2005/0023927 | A1 | 2/2005 | Inayama et al. | |
| 2006/0028082 | A1* | 2/2006 | Asagara et al. | 310/156.53 |
| 2007/0228861 | A1 | 10/2007 | Kinoshita | |
| 2008/0224558 | A1 | 9/2008 | Ionel | |
| 2008/0231135 | A1* | 9/2008 | Suzuki et al. | 310/156.53 |

FOREIGN PATENT DOCUMENTS

| | | |
|---|---|---|
| DE | 102007014973 A1 | 10/2007 |
| DE | 102008018948 A1 | 11/2008 |

OTHER PUBLICATIONS

German Office Action dated Jul. 21, 2010, for Application No. 102010007617.

* cited by examiner

*Primary Examiner* — Quyen Leung
*Assistant Examiner* — Leda Pham
(74) *Attorney, Agent, or Firm* — Ingrassia Fisher & Lorenz, P.C.

(57) ABSTRACT

In general, the various embodiments are directed to a permanent magnet machine ("PM machine"), and more specifically an internal permanent magnet machine ("IPM machine") that includes rotor magnets configured asymmetrically with respect to the rotor periphery, thereby producing an averaging effect similar to that achieved through traditional skewing of the rotor magnets. In alternate embodiments, the span, placement and/or shape of the magnets may vary from one pole to the next.

14 Claims, 2 Drawing Sheets

METHODS AND APPARATUS FOR A PERMANENT MAGNET MACHINE WITH ASYMMETRICAL ROTOR MAGNETS

TECHNICAL FIELD

The present invention generally relates to magnetic devices such as electrical motors, and more particularly relates to interior permanent magnet machines.

BACKGROUND

Interior permanent magnet (IPM) machines are favored for fuel cell and hybrid electric vehicle operations due to their desirable characteristics—i.e., good torque density, good overall efficiency, good constant power range, etc. The rotor field in a permanent magnet machine is obtained by virtue of its structure, unlike other machines such as induction, switched or synchronous reluctance machines, in which the field is generated by a stator current supplied by a source. As a result, permanent magnet machines exhibit superior efficiency as compared to other such machines.

However, as with surface PM machines, an IPM machine is burdened by the fact that the permanent magnet field is present even when the machine is not powered, resulting in losses induced by the rotating permanent magnet field of the rotor. Furthermore, such structures are subject to ripple and cogging torque, which has two major sources. The first is winding harmonics, the majority of which is the $6^{th}$ harmonic generated from the $5^{th}$ and $7^{th}$ winding space harmonics. These winding harmonics can be lowered by short-pitching the winding. For example, for a six lots per pole design, the winding can be short-pitched by one slot (⅙ short pitch).

The second and most significant source of torque ripple is slotting effect brought about by burying the magnet inside the rotor. The interaction between the rotor slots and the stator slots (the winding slots) generates significant torque ripple. One way to minimize this effect is to skew either the rotor or the stator, which results in some averaging, effectively cancelling much of the torque ripple and the cogging. Skewing is widely known in the industry and is routinely performed to lower cogging and ripple torque. This approach, however, lowers machine torque and adds manufacturing complexity and cost.

Accordingly, it is desirable to provide improved, manufacturable IPM machines that reduce cogging and torque ripple. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to electrical motors, magnetism, and the like are not described in detail herein.

In general, the various embodiments are directed to a permanent magnet machine ("PM machine"), and more specifically an internal permanent magnet machine ("IPM machine") that includes rotor magnets configured asymmetrically with respect to the rotor periphery, thereby producing an averaging effect similar to that achieved through traditional skewing of the rotor magnets. In alternate embodiments, the span, placement and/or shape of the magnets may vary from one pole to the next.

Figure 1A:
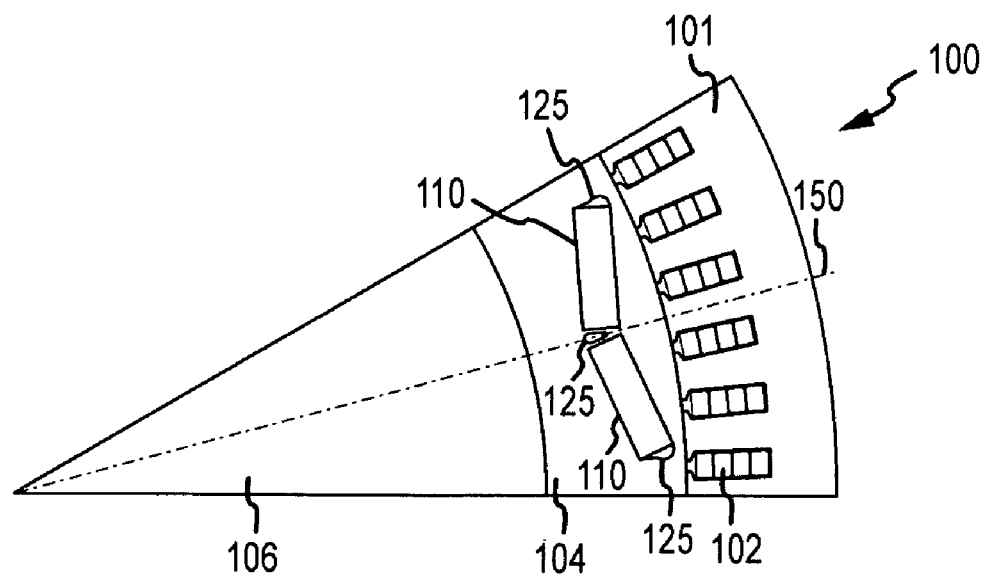
FIGS. 1a and 1b depict, in cross-section, various internal permanent magnet (IPM) machines.

As is known, interior PM machines often incorporate one or more rotor barriers (or simply "barriers"). FIGS. 1(a) and (b), for example, illustrate partial cross-sections through various exemplary IPM machines 100 with single and double barrier rotors. More particular, FIG. 1(a) illustrates a rotor 104 with magnets 110 and air pockets 125 incorporated into the structure at various locations with respect to magnets 110. As is conventional, IPM 100 includes a stator 101 having a plurality of windings 102 magnetically interacting with magnets 110 within rotor 104. Various cavities are provided within rotor 104, and all or a portion of these cavities may or may not be filled with permanent magnets in the conventional manner, depending upon the number of layers incorporated into the structure.

Figure 1B:
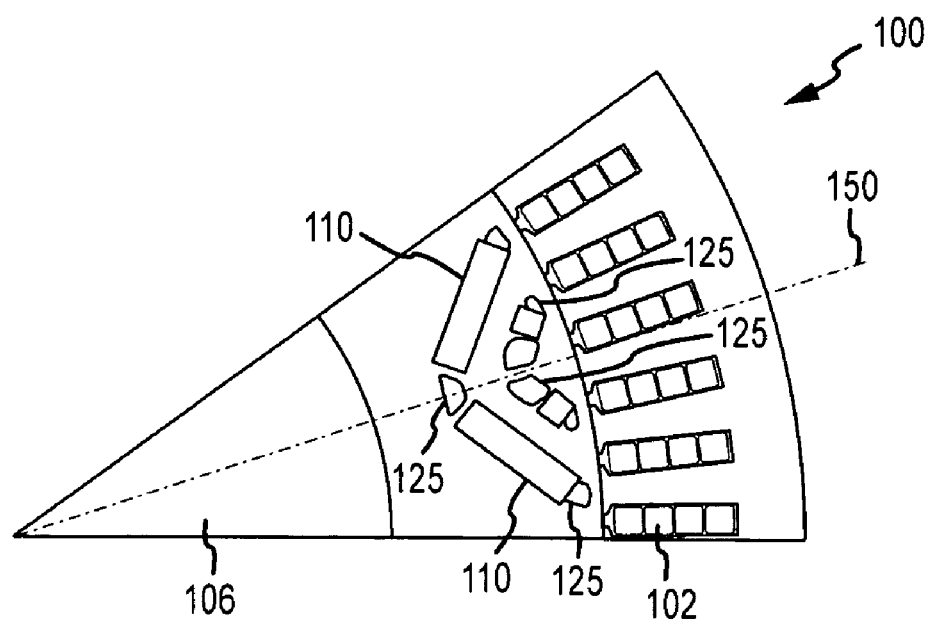

FIG. 1(b), more particularly, depicts a two-barrier PM rotor with the second barrier partially filed with magnets 110. The added second barrier shown in FIG. 1(b) adds additional resistance to the magnetic field produced by lower magnet barrier, lowering the air-gap magnet flux. However, addition of the second barrier in the rotor can mechanically weaken the rotor. Also, for some machines, addition of any such second barrier is not geometrically feasible (e.g., the rotor of FIG. 1(a)).

Rotors with more than two barriers may also be provided; however, such designs undesirably increase manufacturing complexity. Increasing the number of barriers improves rotor saliency, and thus improves machine torque. Moreover, the second rotor barrier often works as a barrier to the inner magnet layer, consequently lowering the magnet flux in the air-gap. Lowering of magnet flux in the air-gap reduces the magnet torque, but is somewhat compensated by the increased saliency of the rotor.

In hybrid applications, when the PM machine is part of a transmission, very often the machine is rotating in conjunction with a different gear-set even though machine is producing no torque or is producing very low torque. If the no-load or light load operation is a substantial portion of the machine drive cycle, the overall efficiency of the transmission is affected. Rotating magnet flux also induces voltage in the stator winding, commonly referred to as back EMF. The high magnet flux of a permanent magnet rotor may induce very high voltage in the stator, especially during high speed operation of the machine. Therefore, lowering of the machine air-gap flux is very desirable for such machines.

As shown in FIGS. 1a and 1b, in traditional IPM machines each configuration of magnets 110 is symmetrical—i.e., exhibiting reflectional symmetry with respect to an axis 150 (or perpendicular plane therethrough) for the illustrated pole.

Figure 2:
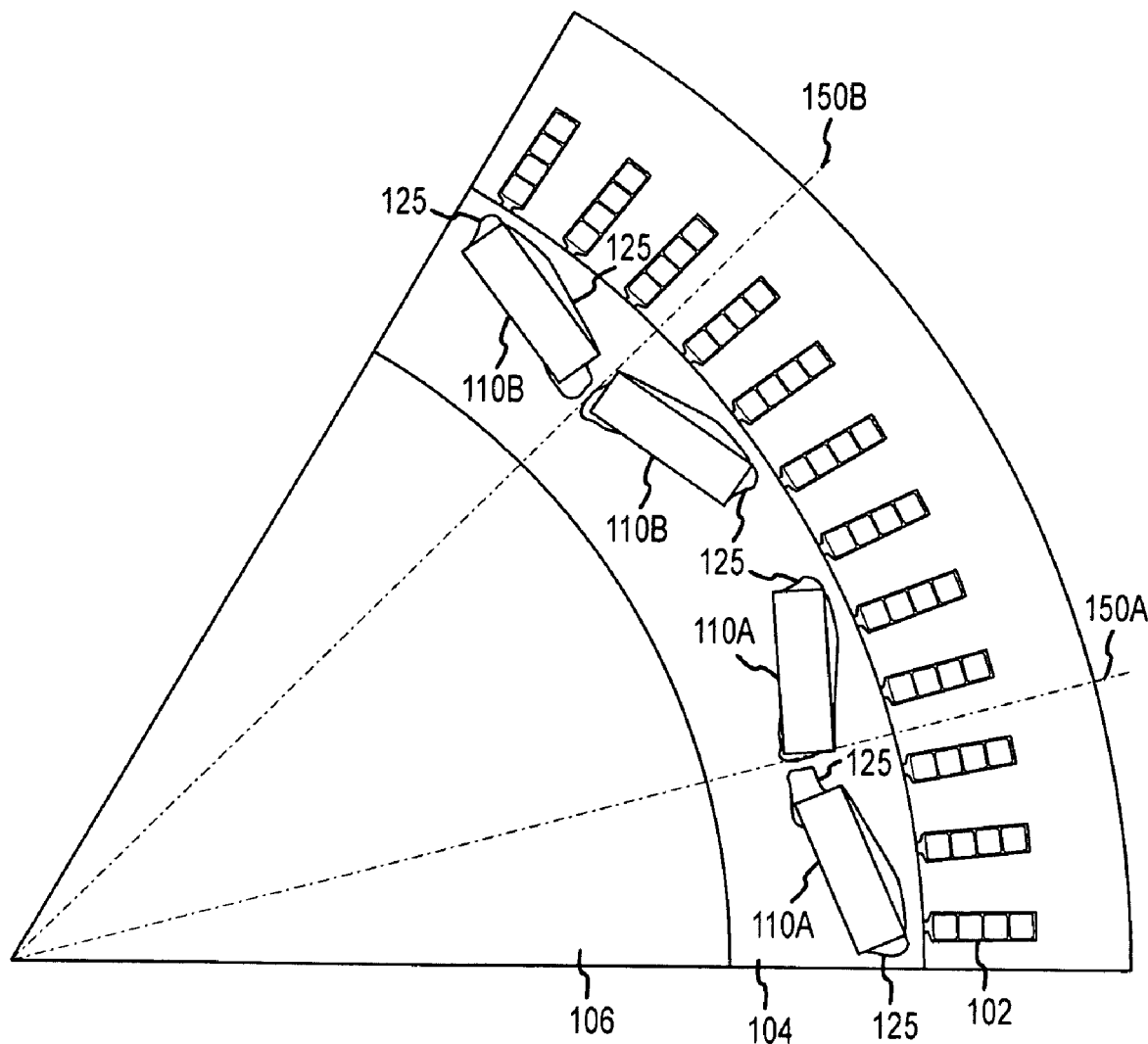
FIG. 2 depicts, in cross-section, an IPM machine in accordance with one embodiment.

In contrast, FIG. 2 illustrates an IPM machine in accordance with one embodiment of the present invention in which magnets 110 are situated asymmetrically with respect to corresponding axes 150 within each pole. That is, magnets 110B do not exhibit bi-fold reflectional symmetry with respect to axis 150B. Likewise, magnets 110A do not exhibit bi-fold reflectional symmetry with respect to axis 150A. As mentioned previously, the nature and extent of the asymmetry may be the same for each pole or different for each pole (as illustrated in FIG. 2).

The IPM machine's asymmetry with respect to the pole axes 150 may be achieved in a variety of ways—i.e., not just through geometric asymmetry as illustrated in FIG. 2. For example, magnets 110 may have different sizes (e.g., masses) or shapes. In general, this is referred to herein as rotor barrier asymmetry. Any asymmetrical configuration that produces an averaging effect similar to that achieved through traditional skewing of the rotor magnets may be used.

In general, the size, location, and geometry of each magnet 110 may be selected to achieve the desired asymmetry and to thus provide the desired level of averaging for rotor 106. Such optimization may be performed empirically or through conventional computer modeling methods known in the art.

While FIG. 2 illustrates a cross-sectional view of magnets 110 and air pockets 125, it will be understood that the cavity extends into rotor 104 and will define a three-dimensional volume having any suitable shape. Rotor 104 is suitably formed by creating cavities that are then filled or partially filled by magnet 110, in which case various air pockets are formed adjacent thereto, i.e.: air pockets 125. The term "cavity" is thus used to refer to the empty regions existing prior to insertion of magnet 110.

In FIG. 2, pairs of rectangular magnets 110 are configured angled toward each other—i.e., defining an obtuse angle facing outward toward the stator surface. It will be understood that many other configurations are contemplated by this invention.

While at least one example embodiment has been presented in the foregoing detailed description, it should be appreciated that a vast number of variations exist. For example, additional barrier layers may be incorporated in addition to the single layer illustrated. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. An interior permanent magnet machine comprising:
    a stator;
    a rotor configured to magnetically interact with the stator, the rotor having an outer surface and a plurality of poles defined by respective pole axes;
    a plurality of rotor barriers provided within the rotor; and
    a plurality of permanent magnets disposed within the rotor such that the magnets are configured asymmetrically with respect to the pole axes;
    wherein the plurality of poles comprises a first pole and a second pole, and wherein the magnets within the first pole do not have the same asymmetrical configuration as the magnets within the second pole, and wherein the plurality of magnets are configured in pairs defining a concave angle toward the outer surface of the rotor.

2. The interior permanent magnet machine of claim 1, wherein the magnets within each pole are substantially the same size and shape, but are asymmetrically spaced with respect to the pole axes.

3. The interior permanent magnet machine of claim 1, wherein the magnets within each pole have different sizes.

4. The interior permanent magnet machine of claim 1, wherein the magnets within each pole have different shapes.

5. The interior permanent magnet machine of claim 1, wherein the plurality of magnets are ferrite magnets.

6. A method of making an interior permanent magnet machine, comprising:
    providing a stator;
    providing a rotor configured to magnetically interact with the stator, the rotor having an outer surface and a plurality of poles;
    forming a plurality of rotor barriers within the rotor;
    placing a plurality of permanent magnets within the rotor such that the rotor barriers are asymmetrical with respect to their respective pole axes, the plurality of poles comprises a first pole and a second pole, the magnets within the first pole do not have the same asymmetrical configuration as the magnets within the second pole, and the plurality of magnets are configured in pairs defining a concave angle toward the outer surface of the rotor.

7. The method of claim 6, wherein the magnets within each pole are substantially the same size and shape, but are asymmetrically spaced with respect to the pole axes.

8. The method of claim 6, wherein the magnets within each pole have different sizes.

9. The method of claim 6, wherein the magnets within each pole have different shapes.

10. The method of claim 6, wherein the plurality of magnets are ferrite magnets.

11. A traction motor of the type used in connection with a hybrid electric vehicle, the traction motor comprising:
    a stator;
    a rotor configured to magnetically interact with the stator, the rotor having an outer surface and a plurality of poles defined by respective pole axes;
    a plurality of rotor barriers provided within the rotor; and
    a plurality of permanent magnets disposed within the rotor such that the magnets are configured to produce rotor barrier asymmetry;
    wherein the plurality of poles comprises a first pole and a second pole, and wherein the magnets within the first pole do not have the same asymmetrical configuration as the magnets within the second pole, and wherein the plurality of magnets are configured in pairs defining a concave angle toward the outer surface of the rotor.

12. The traction motor of claim 11, wherein the magnets within each pole are substantially the same size and shape, but are asymmetrically spaced with respect to the pole axes.

13. The traction motor of claim 11, wherein the magnets within each pole have different sizes.

14. The traction motor of claim 11, wherein the magnets within each pole have different shapes.

* * * * *